(12) United States Patent
Hukelmann et al.

(10) Patent No.: US 8,616,602 B2
(45) Date of Patent: Dec. 31, 2013

(54) SUCTION GRIPPER FOR FOOD

(75) Inventors: Bernhard Hukelmann, Quakenbrueck (DE); Knut Franke, Quakenbrueck (DE); Volker Heinz, Quakenbrueck (DE)

(73) Assignee: Deutsches Institut fuer Lebenmitteltechnik, e.V., Quakenbrueck (DE)

( * ) Notice: Subject to any disclaimer, the term of this patent is extended or adjusted under 35 U.S.C. 154(b) by 0 days.

(21) Appl. No.: 13/197,967

(22) Filed: Aug. 4, 2011

(65) Prior Publication Data

US 2012/0032461 A1 Feb. 9, 2012

(30) Foreign Application Priority Data

Aug. 4, 2010 (DE) .................. 10 2010 038 931

(51) Int. Cl.
*B25J 15/06* (2006.01)

(52) U.S. Cl.
USPC .......................................... 294/183

(58) Field of Classification Search
USPC .......... 294/183–189, 64.3; 414/752.1; 901/40
See application file for complete search history.

(56) References Cited

U.S. PATENT DOCUMENTS

| 3,993,301 | A | * | 11/1976 | Vits .................................. 271/98 |
| 4,453,755 | A | * | 6/1984 | Blatt et al. ................... 294/64.2 |
| 5,626,378 | A | * | 5/1997 | Puhl et al. ..................... 294/186 |
| 6,213,521 | B1 | * | 4/2001 | Land et al. ..................... 285/361 |
| 6,213,528 | B1 | * | 4/2001 | Hufken et al. ................. 294/186 |
| 6,663,092 | B2 | * | 12/2003 | Kashiwazaki et al. .......... 269/21 |
| 8,267,386 | B2 | * | 9/2012 | Schaaf et al. ................... 269/21 |
| 2007/0210225 | A1 | * | 9/2007 | Carnevali ................... 248/205.8 |

FOREIGN PATENT DOCUMENTS

| DE | 20 2008 010424 U1 | 1/2010 |
| JP | 10167470 | 8/1998 |

\* cited by examiner

*Primary Examiner* — Paul T Chin
(74) *Attorney, Agent, or Firm* — Greer, Burns & Crain Ltd.

(57) ABSTRACT

A suction gripper has a driver that is a compressed-air source. The suction gripper has a suction opening opened up by a pipe section forming a suction section. At a distance from the suction opening, a convex surface is arranged spaced from the suction section by an annular outlet. The suction gripper has a central channel formed in a central well. The central channel has a first opening opened up by a convex surface around the central channel. The central channel adjacent to the convex surface has its smallest cross-section and from this broadens towards the second opening opposite the first opening. In a particular suction gripper, the annular outlet is formed by a section of the convex surface spaced radially from the longitudinal axis of the central channel and by a shoulder spaced axially thereto, which covers the convex surface at least in an annular region.

16 Claims, 5 Drawing Sheets

SUCTION GRIPPER FOR FOOD

The invention relates to a suction gripper, also named vacuum gripper, for periodic and cyclic lifting of objects, respectively, against a suction opening and for putting down of the objects from the suction opening as well as to the use of the suction gripper as a lifting device, especially for food, as well as to a method for cyclic lifting and transporting of objects, respectively, especially of food by means of the suction gripper. The suction gripper according to the invention has a suction opening in which low pressure is produced with a drive which consists of a compressed-air source such that the suction gripper is built and works without a low-pressure source and without electrical drive for the generation of low pressure.

STATE OF THE ART

For the transport of objects it is generally known to arrange suction grippers at their surfaces which by means of a connected low-pressure source or by a built-in vacuum pump produce a low pressure.

EP 2149517 A2 describes a generic suction gripper having an ejector nozzle operating with compressed air for generation of low pressure at its suction side and having a suction chamber connected to the suction side opening up a suction opening covered by a grid.

Known suction grippers, in case they have a low-pressure source or a pump for generation of low pressure, are prone for soiling, since adherences or loose components of the sucked-up commodity reach the low-pressure pipelines through the suction opening.

OBJECT OF THE INVENTION

Therefore it is the object of the invention to provide a suction gripper the inner surfaces of which including the low-pressure regions are easy to clean and which especially does not require a connection for a low-pressures source.

SUMMARY

Preferred embodiments provide a suction gripper for use as a lifting device for an object, wherein the suction gripper has a suction opening opened up by a pipe section forming a suction section, wherein at a distance to the suction opening a convex surface is arranged spaced from the suction section by an annular outlet, which surface opens up a first opening of a central channel formed in a central well, wherein the convex surface leads into an axial section having the smallest cross-section of the central channel, to which a section of the central channel adjoins which broadens up to a second opening opposite the first opening, and the annular outlet is connected to a compressed-air connection via an inlet duct, wherein the central well is guided longitudinally movable in a recess of the pipe section, until a first abutment face of the central well at its outer surface opposite the central channel fits closely to a parallel second abutment face of the pipe section. In preferred grippers, the annular outlet is formed by a section of the convex surface spaced radially from the longitudinal axis of the central channel and by a shoulder spaced axially thereto, which covers the convex surface at least in an annular region. In other grippers, the central well is guided in a recess of a socket of the pipe section, and the second abutment face comprises the recess of the socket. In another gripper, at the central well, an actuator is arranged by which the central well is at least sectionally moveable in relation to the shoulder of the pip section. In still another gripper, the central well is locked to the pipe section by one of a bayonet catch or by a thread. In yet another gripper, the second opening of the central well is connected to a pipeline which projects above a casing and the second opening of the central well is connected to a pipeline which projects above the casing. In an additional gripper, the casing is arranged at a distance to the second opening and encloses an outlet duct leading into an outlet opening which is delimited by the pipe section and the casing and is directed towards the plane in which the suction opening lies.

GENERAL DESCRIPTION OF THE INVENTION

The invention attains the object by the features of the claims and by combinations of the features mentioned in the claims and especially provides a suction gripper the drive of which consists of a compressed-air source and which is disposed, respectively, that a connectable drive means can consist of a compressed-air source. The suction gripper according to the invention in a casing has a central channel which preferably is arranged along the longitudinal axis of the casing. The central channel has a first opening opened up by a convex surface around the central channel. The convex surface preferably extends rotationally symmetrically around the longitudinal axis of the central channel, and particularly preferred has a curvature parabolic to the radius of the longitudinal axis of the central channel, the incline of which curvature increases in the direction towards the longitudinal axis of the central channel, i.e. its incline increases with decreasing radius in order to form a curvature increasing in the direction towards the longitudinal axis. Adjoining the convex surface the central channel has its smallest cross-section and from this smallest cross-section broadens in the direction towards its second opening opposite the first opening, preferably having a conically increasing cross-section.

The first opening of the central channel is delimited by an annular outlet of an inlet duct. Therein, the annular outlet is formed by a shoulder spaced from the convex surface such that the cross-section of the outlet is arranged at a section adjoining the first opening, preferably spaced by an axial section of the longitudinal axis of the central channel. The shoulder preferably is annular such that it forms an annular outlet about the longitudinal axis of the central channel with the spaced convex surface which opens up the first opening.

Opposite the first opening and spaced by the annular outlet the suction gripper has a suction section opening up a suction opening which preferably is formed by rigid or flexible sealing lips.

The suction opening preferably has an open cross-section, wherein the cross-section of the suction section formed by the pipe section is spanned by webs or by a grid, which reduce the penetration by sucked-up objects, especially by food components. Preferably, a grid spanning the suction section preferably at a distance to the suction opening, has grid openings having a cross-section identical or smaller than the cross-section of the central channel at its section of the smallest cross-section. In this embodiment only components are sucked up through the grid which can also pass the section of the smallest cross-section of the central channel, such that obstructions of the central channel are avoided. Grids or webs can be arranged within the pipe section at a distance to the suction opening, e.g. spaced from the suction opening at 10% to 80% or up to 50% of the distance between the suction opening and the first opening. In embodiments having a grid the suction gripper is particularly suitable for use as a portioning device and a transport device for food and for a method for portioning and transporting of food which is smaller than the suction opening, e.g. for vegetables like peas, beans, vegetable slices or their pieces. This is because food which is smaller than the cross-section of the suction opening is sucked up against the grid in exactly one layer and upon being sucked up from a store tank is sucked up by the suction gripper in the same amount each time and subsequently can be delivered in this amount, e.g. upon interruption of the compressed-air connection or upon closing of the second opening of the central channel.

The suction gripper also allows moving of an elastic object to be held and to be transported, respectively, especially food, against the rigid edges of the pipe section opening up the suction opening by means of the low pressure produced, wherein the elastic object is partially drawn into the suction opening and bends into the suction opening, respectively. Therefore, the suction gripper is particularly suitable for use in holding or transporting of elastic objects, since due to the low pressure produced these partially bend through the plane of the suction opening into the suction section and into the pipe section, respectively, and thereby at least partially seal the suction section by fitting closely against the edges.

For the purposes of the invention objects preferably are elastic objects, especially food, wherein human bodies or complete animal bodies or their parts are also comprised as elastic objects.

Webs or grids spanning the suction opening and the suction section, respectively, can have passage openings which are smaller than the object which is to be transported, since the suction gripper generally is disposed to suck up the object against the suction opening upon compressed-air connection, and to drop the object from the suction opening upon interruption of the compressed-air connection, e.g. under gravitational influence. Correspondingly, the suction gripper preferably has a valve which is disposed for periodically opening for the compressed-air connection towards the annular outlet, such that then an object is sucked up to the suction opening, and to correspondingly interrupt the compressed-air connection to let the object drop from the suction opening.

The second opening of the central channel is connected to an outlet opening from which the compressed air streaming in through the annular outlet emerges in mixture with air sucked in through the suction opening and with sucked-up solid and/or liquid components. This is because the convex surface opening up the first opening upon admission of the annular outlet with compressed air produces a low pressure acting into the suction section, wherein the compressed air exiting through the annular outlet streams along the convex surface into the central channel and emerges through its opposite second opening.

Optionally, the second opening of the central channel can at least partially, particularly completely be lockable, e.g. by means of a valve which is arranged at the second opening or at the outlet duct adjoining the second opening. The valve can be arranged directly at the second opening or at a pipeline which is connected to the second opening of the central well and forms the outlet duct. The step of closing the second opening in a method using the suction gripper results in an object sucked up at the suction opening being pushed off and blown off from the suction gripper, respectively. This is because the closing of the second opening prevents the streaming out of compressed air mixed with air sucked-in through the central channel while producing an overpressure within the suction gripper which emerges through the suction opening.

Preferably, the outlet opening is formed by the second opening of the central channel being connected to an outlet duct leading into the outlet opening. The outlet opening preferably has a cross-section directed towards the plane in which the suction opening is arranged, and preferably in parallel to the cross-section of the suction opening, such that solid or liquid components emerging from the outlet opening emerge in the direction towards the object arranged at the suction opening.

In one embodiment the outlet duct is formed by a section of the casing which is arranged with a spacing around the surface of the pipeline opposite the inlet duct. In that, inlet duct and outlet duct can be arranged coaxially to the central channel and can be separated from one another by a pipeline which is arranged between the casing and the outer wall of the central channel.

Preferably, the outlet duct is formed by the inner wall of a casing and the pipe section forming the suction section and having a shoulder which delimits the annular outlet in combination with the spaced convex surface of the first opening of the central channel. The casing encloses the central well forming the central channel such that the surface of the central well opposite the central channel in combination with the inner wall of the casing and a part of the pipe section forms the outlet duct. Preferably, the casing has a compressed-air connection and the adjacent inlet duct which guides compressed air to the annular outlet. The inlet duct in a section preferably is formed as a pipe or a tube and has a ring channel section arranged around the annular outlet which preferably is coaxial to the annular outlet. The ring channel section preferably has a constant cross-section arranged rotationally symmetrically around the annular outlet. The section of the inlet duct formed as pipe or tube can be arranged outside the casing or can preferably run within the casing. Particularly preferred, the inlet duct runs within at least one holding bar connecting the pipe section to the casing and which is fastened e.g. at a casing section arranged opposite the suction opening, e.g. at the second end. Preferably, the casing section opposite the suction section is formed as a carrier plate which has a fastening device for fastening of the suction gripper to a machine arm or to a robot arm and which optionally bears the compressed-air connection. Correspondingly, the casing opposite the suction opening preferably has a carrier plate which by means of at least one carrier is connected to the pipe section. In this embodiment it is preferred that the casing is spaced from the second opening of the central well, in particular by the carrier plate being arranged at a distance from the second opening, such that the volume between the inner wall of the casing and the central well forms the outlet duct, such that e.g. by the increase of the cross-section from the central channel to the outlet duct a reduction of the flow velocity and/or a reduction of the noise development at the outlet opening is achieved.

Further preferred, the casing opposite the second opening of the central well, e.g. the cover plate, is formed convexly towards the inner volume, e.g. dome-shaped, having a parabolic cross-section, or cone-shaped, and particularly symmetrical to the longitudinal axis of the central well, such that the casing and the cover plate, respectively, extend in the direction towards the central well. Due to the low noise development upon operation this embodiment is advantageous, e.g. in comparison to a casing having a cylindrical inner cross-section.

The suction gripper has a suction opening opened up by a pipe section forming a suction section, wherein at a spacing from the suction opening a convex surface is arranged spaced from the suction section by the annular outlet, which annular outlet opens up a first opening of a central channel formed within a central well, wherein the convex surface leads into an axial section having the smallest cross-section of the central channel, to which a section of the central channel adjoins which broadens up to a second opening opposite the first opening, and the annular outlet is connected to the compressed-air connection by an inlet duct, wherein the central well along its longitudinal axis is guided movably within a recess of the pipe section, until a first abutment face of the outer surface of the central well opposite the central channel closely fits to a parallel second abutment face of the pipe section, wherein preferably the central well is enclosed by a casing.

Preferably, the suction gripper is easy to clean and especially is suitable for use for cleaning in an automatic dishwashing machine by the central well being arranged detachably at a section of the pipe section spaced from the first opening. In this embodiment the central well at its surface arranged opposite the central channel can have a first abutment face which extends at least partially, preferably circumferentially closed around the central well. The central well is arranged detachably at the pipe section in that the first abutment face of the central well detachably abuts against a second abutment face arranged at the pipe section, and optionally is catchable with the second abutment face and particularly only lies against the second abutment face and is only loaded against the second abutment face by gravitation and/or by the force produced upon entry of compressed air. In this embodiment the central well can be removed from the second abutment face by unlatching and moving without detaching a connection, respectively, such that for cleaning the central well can easily be separated from the pipe section and the elements arranged on this.

Preferably, the second abutment face is at least partially, more preferred completely in parallel to the first abutment face, in order to form a sufficient seal between the inlet duct and the central channel upon their arrangement against one another. Preferably, the first abutment face is arranged in an axial section between the first opening opened up by the convex surface and the opposite second opening of the central well, and the second abutment face is arranged in that distance to the shoulder of the pipe section which is equal to the distance between the first abutment face and the first opening plus the axial extent of the annular outlet. Further preferred, the first and second abutment faces extend radially to the longitudinal axis of the central well.

Preferably, the second abutment face is arranged at a socket of the pipe section opposite the suction opening. The socket preferably comprises a portion of the inlet duct, and together with the annular shoulder of the pipe section forms the ring channel section which extends about the annular outlet. Optionally, a socket in the section adjoining a casing has recesses. The casing can be connected to the socket, e.g. by means of engagement of the socket and a section of the casing adjacent the outlet opening. Preferably, the casing has a carrier plate which is connected to the socket by means of at least one carrier which preferably extends in parallel to the central well. Particularly preferred at least two, more preferred three carriers are arranged between carrier plate and socket, at least one of which carriers forms a tubular section of the inlet duct. Optionally, the suction gripper can have exactly one carrier which is arranged between carrier plate and socket and forms a tubular section of the inlet duct.

Optionally, an actuator is arranged at the central well by which the central well can be moved in relation to the shoulder of the pipe section, especially it can be moved in parallel to the longitudinal axis of the central well. Such an actuator can move the entire central well in relation to the first opening, or can move a section of the central well in relation to the first opening, e.g. in case the actuator moves two sections of the central well one against the other. The section of a central well facing the second end, which central well is divided into two sections, preferably is fastened at the casing. By means of such an actuator the spacing of the first opening and of the convex surface of the central well, respectively, to the shoulder of the pipe section can be adjusted such that the annular outlet is adjustable by the actuator, and therefore the intensity of the low pressure is adjustable which is generated by the compressed air streaming into the annular outlet in particular at identical pressure of the compressed air. Furthermore, such an actuator serves to control the amount of air streaming through the central channel, such that e.g. in the embodiment having a valve closing the second opening of the central channel the amount of air emerging from the suction opening with the central channel closed is controlled. Such an actuator adjusting the cross-section and the size of the annular outlet, respectively, can be arranged e.g. between the first abutment face and the second abutment face or between the central well and the casing. The actuator e.g. can have a piezoelement and can be arranged between first and second abutment faces. Alternatively, the actuator can move two sections of the central well against one another along the central axis of the central well, which e.g. are movable against one another or engage one another by means of a thread.

Optionally, the actuator can be controlled by a pressure sensor which is arranged in the suction section of the pipe section, such that in the method a control of the low pressure at the suction opening results. Correspondingly, the suction gripper in a preferred embodiment has a pressure sensor arranged in the suction section controlling the actuator, e.g. in order to control a predetermined low pressure at the suction opening in the method.

Optionally, the central well engages the pipe section, when the first abutment face is arranged against the second abutment face, e.g. in engagement by means of a thread or by means of a bayonet catch. In this embodiment the actuator can have a setscrew and/or a servomotor and can be arranged between pipe section and central well, wherein the central well rotationally engages a thread of the pipe section.

In this embodiment the central well optionally can be arranged positionally accurate at the pipe section exclusively by arrangement of its first abutment face against the second abutment face arranged at the pipe section, preferably in combination with the guidance of the central well along its longitudinal axis within the pipe section, in order to form the annular outlet with the first opening, since upon operation the compressed air streaming through the annular outlet generates a low pressure loading the convex surface of the central well against the abutment face. When the first abutment face is formed by an e.g. annular lug around the central well, the overpressure generated within the casing can load and hold the lug of the central well against the second abutment face. Correspondingly, the suction gripper of this embodiment can be formed without a firmly bonded or clamping connection or a screwed joint, respectively, between the central well and the pipe section.

In an embodiment the suction gripper can have a pipe section having a preferably circular shoulder and a second abutment face arranged at a spacing from the shoulder and a ring channel section arranged between the shoulder and the second abutment face, which ring channel is connected to an inlet duct, as well as a central well having a first opening which is bordered by a convex annular surface, an opposite second opening and a first abutment face which are formed in parallel to the second abutment face and which are arranged against the second abutment face and arranged between the first and second openings of the central well, or can consist thereof, wherein preferably an outlet opening is formed by the second opening of the central well being connected to the outlet duct, which in particular is formed by the inner wall of the casing and the outer surface of the central well, wherein the outlet duct leads into an outlet opening which is arranged in the direction towards the plane in which the suction opening is opened up.

Generally, in an alternative to the opening between casing and the pipe section forming the suction opening, the outlet opening can be formed by one end of a pipeline which is connected to the second opening of the central well. This alternative embodiment allows the disposal of the exhaust air emerging from the second opening of the central well in a greater distance from the casing. This embodiment is advantageous in that the noise development in operation is lower at the casing itself.

Preferably, the inlet duct leading into the annular outlet is formed by the outer wall of the central channel and a pipeline spaced therefrom, which preferably is cylindrical. The inlet duct is connected by a feeding pipe to a compressed-air connection to which a compressed-air source is connectable. Upon use of the suction gripper according to the invention in a method for transport and lifting, respectively, of objects, which preferably are food items, the compressed-air connection is loaded with compressed air streaming through the inlet duct and through the annular outlet about perpendicularly to the longitudinal axis of the central channel. In this manner, the convex surface extending radially around the longitudinal axis of the central channel is streamed against by compressed air streaming radially to the longitudinal axis of the central channel. In coaction with the increasing diameter of the central channel in its section adjoining its section having the lowest cross-section adjoining the convex surface, a low pressure is generated which acts through the pipe section into the suction opening opened up by the pipe section. The suction opening can be bordered by a lip seal which is mounted at the pipe section. When arranging an object over the suction opening and at the lip seal, respectively, wherein preferably the object contacts the lip seal and covers the suction opening, the suction gripper sucks up the object against the lip seal. Upon movement of the suction gripper in perpendicular to the cross-section of the suction opening, e.g. in direction against the suction opening, the object arranged at the lip seal is transported, especially lifted, if the suction gripper is moved in a direction against gravity. An advantage of the suction gripper according to the invention lies in that also objects can be moved by it which cover the suction opening only partially, since solely the low pressure and the air current into the suction opening, respectively, result in a lifting of objects. Therefore, the suction gripper is particularly suitable for use as a lifting device and in a method for gentle transport, respectively, for sensitive and/or perforated and/or small objects, especially food items, which are transported without contact to the suction opening of the pipe section or a lip seal arranged thereon, especially in the embodiment in which a grid having openings smaller than one of the objects spans the suction section. Correspondingly, an advantage of the suction gripper is that objects can be transported also with bigger leakages between the suction opening and the object arranged thereon. Therefore, the suction gripper is particularly suitable for use as transport device or lifting device and in a method for transport of pressure-sensitive and/or fracture-sensitive food items, respectively, e.g. meat, meat products and sausage products, cheese, especially in the form of slices, bakery products, cookies and chocolate products, especially chocolates, and small food items and their pieces.

The compressed air emerging through the annular outlet in mixture with the air and solid and liquid components, respectively; entering through the suction opening passes through the first opening, through the central channel and after passing the outlet duct out of the outlet opening. Since the central channel in its section adjacent the convex surface opposite the first opening has its smallest cross-section, sucked-up components passing through this smallest cross-section of the central channel can exit through its second opening by the current along the central channel and subsequently can exit through the outlet duct and the outlet opening, without being sucked up by a low-pressure source. In this manner, by the special guidance of flow and due to the absence of a low-pressure source, the possible soiling outside of the suction gripper is avoided. Upon arrangement of the outlet opening in the direction towards the plane in which the suction opening is arranged, solid or liquid components separated from the sucked-up object can be re-transferred onto the sucked-up object. Alternatively, the outlet opening can have a pipeline or a tube, optionally having a connected filter or a cyclone for separation of solid or liquid components from emerging air.

The central channel is formed by a central well, at the first end of which the first opening of the central channel is arranged and the opposite second end of which has the second opening. The outer wall of the central well opposite the central channel in the preferred embodiment in combination with a pipeline comprising the central well, which preferably is cylindrical, forms the inlet duct for compressed air.

In an optional embodiment, the central well consists of at least two sections, of which a first section comprises the region of the central channel from its first opening up to at least the smallest cross-section of the channel, more preferred into a region of the conically broadening central channel, and an adjoining second section continuing the central channel, which comprises for example its conically broadening section and the second opening or ends within the second opening. Particularly preferred, the first and the second sections of the central well are slidable against one another along the longitudinal axis of the central channel, for example in that they are moveable against one another along the longitudinal axis of the central channel by means of a threaded engagement.

Preferably, the casing encloses the central well which is arranged at least sectionally coaxially within the cylindrical pipeline with a spacing by which the outlet duct is formed between the pipeline and the casing.

In each embodiment the suction gripper additionally can have a holding device at the suction opening of the pipe section having a form having openings, the form being adapted for holding of food items, wherein the openings allow the generated low pressure to act into the inlet cross-section opened up by the holding device, and to act beyond the inlet cross-section and to generate the Bernoulli-effect with a food item. The holding device in particular has a surface having a shell shape or a funnel shape having openings, wherein the funnel shape is arranged within the suction section, e.g. within the pipe section, optionally up to adjacent the suction opening. Preferably, the shell shape or funnel shape has slot-shaped openings. The shell shape or funnel shape is concave against the plane of the suction opening in a funnel-shaped way or in a curved way, wherein the shell shape or funnel shape preferably has curvedly convex surfaces. The part of the pipe section in which the holding device is arranged can be formed of one single piece with the pipe section extending over the suction section or can be a separable part of the pipe section which e.g. is fastened by means of a clamping device or catching device, especially by means of at least one clamp and/or a hooked connection arranged at the outer surface, by a thread and/or by a bayonet catch.

Correspondingly, the invention also relates to a method for holding by sucking up of food items which particularly are to be filled, e.g. for holding of fruit, fresh or pickled, by means of the suction gripper having a holding device. Optionally, the method has the subsequent step of filling the food items held in the holding device, e.g. with a further chunky food or a pasty food mass. Optionally, the method prior to the filling can have the step of hollowing out the food items held in the holding device, e.g. the hollowing out of tomatoes. It has been found that the suction gripper having a holding device is particularly suitable for holding of food items which have lost their original hollow form, mostly a funnel-, tube-, ball- or pear-shaped form, and which are compressed, e.g. by pickling in brine or oil in higher layers, especially tropical fruit, pickled tomatoes, pepper, including capsicum and cascable chili, and chillies, since the arrangement of a fruit in the holding device by means of the generated low pressure leads to a gentle unfolding of the fruit, such that a hollow form is produced and preferably the natural form is approximately reconstituted. The holding and unfolding allows an easy filling of the fruit. The effective and gentle unfolding of fruits is attributed to the low pressure acting through the openings onto the outer surface of the fruit generating a Bernoulli-effect.

SHORT DESCRIPTION OF THE FIGURES

The invention is now described in greater detail with reference to the Figures which schematically show in FIG. 1 an embodiment of the suction gripper in sectional view, in FIG. 2 a preferred embodiment of the suction gripper in sectional view, in FIG. 3 the embodiment of FIG. 2 with the sectional plane in front of the central well, in FIG. 4 an embodiment adapted for the unfolding of fruits and in FIG. 5 a further embodiment adapted for the unfolding of fruits.

DETAILED DESCRIPTION OF THE INVENTION

In the Figures, the reference numbers denote functionally equal elements. The details described in the Figures are combinable in accordance with the invention, also when described with reference to different Figures.

Figure 1:
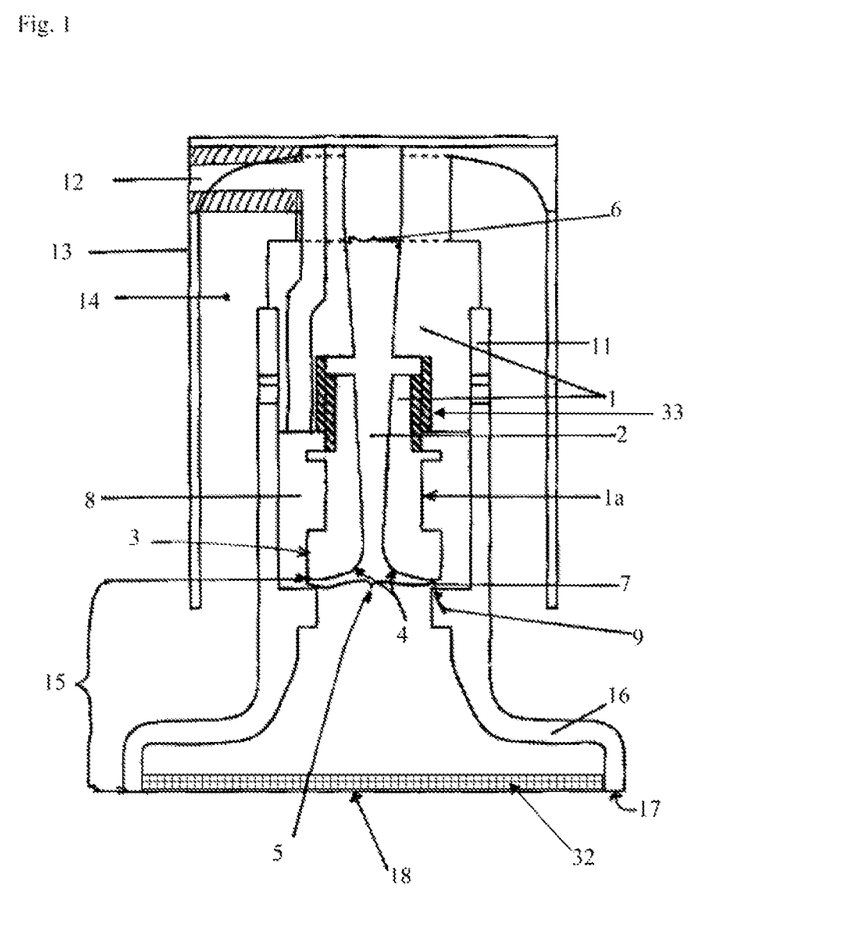

As depicted in FIG. 1, the suction gripper has a central well 1 in which a central channel 2 is arranged, preferably coaxially to the central well 1. At the first end 3 of the central channel 2 a convex surface 4 of the central channel 2 opens up the first opening 5 of the central channel 2. The convex surface 4 extends from the smallest cross-section of the central channel 2 into the plane in which the first opening 5 is opened up. Preferably, the convex surface 4 in perpendicular to the longitudinal axis of the central channel 2 has a parabolic cross-section the incline of which increases from the plane in which the first opening 5 is arranged towards the section of the central channel 2 having the smallest cross-section. Opposite the plane in which the first opening 5 is opened up and adjacent to the region of the smallest cross-section of the central channel 2 a section extends, the cross-section of which increases in the direction towards the second opening 6, especially broadens conically from the smallest cross-section of the central channel 2 towards the second opening 6. The second opening 6 forms the second end 10 of the central well 1 opposite its first end 3. Adjoining the first opening 5, an annular outlet 7 is arranged to which an inlet duct 8 for compressed air is connected. Preferably, the annular outlet 7 is directed about perpendicularly to the longitudinal axis of the central channel 2, particularly preferred in perpendicular to the convex surface 4, in order to tangentially stream exiting compressed air against this surface.

The annular outlet 7 is formed by a region of the convex surface 4 spaced from the central axis of the central channel 2, and by a shoulder 9 spaced therefrom which e.g. borders on the inlet duct 8.

The inlet duct 8 is formed by a region of the outer wall 1a of the central well 1 and at least sectionally by a pipeline 11 which particularly preferred is cylindrical and is arranged coaxially to the central channel 2. A compressed-air connection 12 that is arranged at the casing 13 is connected to the inlet duct 8 by means of a compressed-air channel.

An outlet duct 14 which leads into an outlet opening 19 is connected to the second opening 6 of the central channel 2. The outlet duct 14 according to the preferred embodiment is formed sectionally by the inner wall of the casing 13 and by the outer wall of the pipeline 11. The outlet duct 14 can be formed by the inner wall of the casing 13 which is arranged with a spacing around the central well 1. The outlet opening 19 according to the preferred embodiment is directed towards the plane in which the suction opening 18 is opened up.

The shoulder 9 comprises the region in which the first opening 4 is arranged and the region of the first end of the central well 1 which can also be named suction section 15, respectively, in which upon loading of the suction gripper with compressed air at the compressed-air connection 12, a low pressure is produced. The suction section 15 is formed by a pipe section 16 which opposite the shoulder 9 leads into a lip seal 17 opening up the suction opening 18. Preferably, the suction opening 18 is opened up in a plane which is about in parallel to the plane of the first opening 5.

The pipe section 16 spans the suction section 15 from the shoulder 9 arranged annularly around the annular outlet 7 to the plane in which the lip seal 17 is arranged. The pipe section 16 can taper or broaden along the suction section 15 to the suction opening 18; preferably, the suction opening 18 spans a cross-section which is identical or bigger than the cross-section of the casing 13. Preferably, the pipe section 16 spanning the suction section 15 is formed as one single piece with the pipeline 11 and the shoulder 9.

Further preferred, the central well 10 and its second section, respectively, is connected to the inner surface of the casing 13. Optionally, the central well 1 and its second section, respectively, can be formed as one single piece including the casing 13. The pipeline 11 can be fixed at the central well 1 or at its second section, especially in embodiments in which the central well 1 is formed by a first and a second section and the first section is movable in relation to the second section of the central well 1 along the longitudinal axis of the central channel 2, for example by means of a thread in which the first and second sections of the central well 1 engage one another. Such a thread forms an actuator 33, by which the section of the central well 1 adjoining the annular outlet 7 is movable against the shoulder 9.

An optional grid 32 which upon use of the suction gripper for portioning of food spans the pipe section 16 is arranged in level with the suction opening 18. Upon positioning of this suction gripper in a store tank with small food or food pieces having a size in the range bigger than the openings of the grid 32 and smaller than the cross-section of the suction opening 18, the food or food pieces are sucked up against the grid 32 in exactly one layer, such that a precise portioning takes place solely by the surface of the grid 32.

Figure 2:
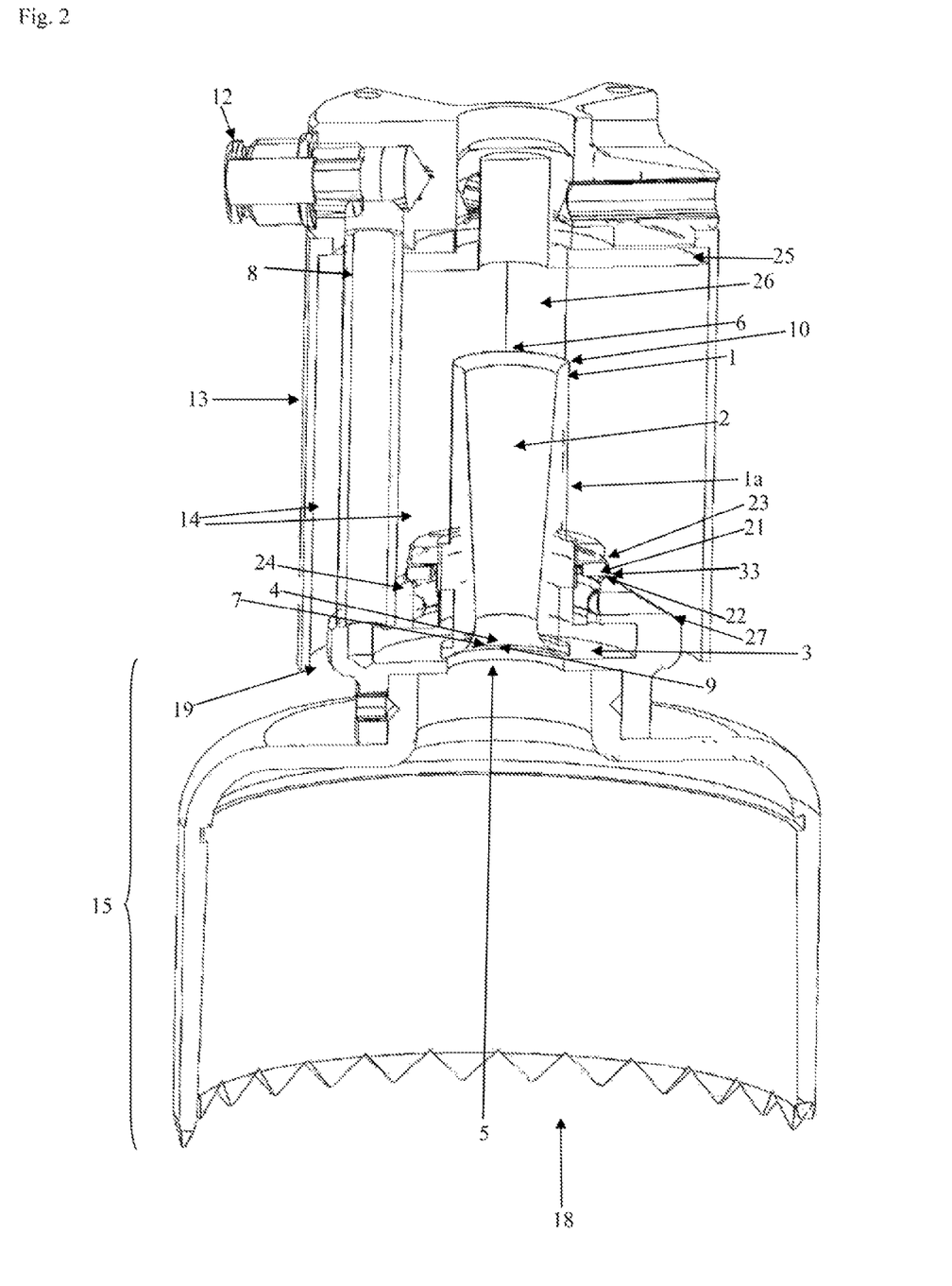

In the embodiment of FIG. 2, the compressed-air connection 12 is arranged at the end of the casing 13 arranged opposite the suction opening 18. The compressed-air connection 12 is formed by means of a tubular inlet duct 8 which in the casing 13 extends from its end opposite the suction opening 18 to the pipe section 16 and within the pipe section 16 has a ring channel section 20 extending around the annular outlet 7. The annular outlet 7 is formed by the annular shoulder 9 of the pipe section 16 and by the spaced convex surface 4 of the first opening 5 of the central well 1. The central well 1 on its inner surface forms the central channel 2 which extends from the first opening 5 at the first end 3 to the second opening 6 at the opposite second end 10, and has a section having the smallest cross-section adjoining the convex surface 4 between the first end 3 and the second end 10 and increases between this section having the smallest cross-section towards the second end. Generally, as depicted here, too, the pipe section 16 can have a bigger diameter than the annular shoulder 9 and than the annular outlet 7, respectively. Therein, it is preferred that the inlet duct 18 has a ring channel section 20 extending over a portion of the radial section, preferably over the complete radial section between the annular outlet 7 and the diameter of the pipe section 16 adjoining the annular outlet 7.

The central well 1 at its outer surface that lies opposite the central channel 2 has a first abutment face 21. The first abutment face 21 can be formed by a recess in the perimeter of the central well 1 or by a lug 23 projecting above the central well 1. The recess and the lug 23 projecting above the central well 1, respectively, preferably are annular and form an annular first abutment face 21. The first abutment face 21 can extend radially around the longitudinal axis of the central well 1 in a plane or can be a section of a conical face, which optionally is curved. The second abutment face 22 is in parallel to the first abutment face 21, such that first and second abutment faces 21, 22 are on top of one another. The central well 1 is enclosed by a section and socket 24, respectively, of the pipe section 16, and is guided longitudinally movable, respectively, such that the central well 1 is introduced into this section and into the socket 24, respectively, until its first abutment face 21 abuts the second abutment face 22. Optionally, an actuator 33, e.g. a piezoelement, is arranged between the first abutment face 21 and the second abutment face 22. By actuating the actuator, the central well 1 is shifted along its longitudinal axis in relation to the pipe section 16, such that the height of the annular outlet 7 between the shoulder 9 and the convex surface 4 is changed. Because of the great influence of the height of the annular outlet 7 on the low pressure produced by means of the compressed air, the actuator 33 generally is suitable for regulation of the low pressure produced during the method for holding or transporting. Furthermore, the actuator 33 in addition to the effect as a control device for low pressure and air volume has the advantage of forming a stop valve for the compressed air in combination with the shoulder 9 and the region of the convex surface 4.

The casing 13 has a carrier plate 25 which by means of at least one tubular section of the inlet duct 8 is connected to the pipe section 16, preferably to at least two, more preferred to three carriers 26 extending between carrier plate 25 and pipe section 16, wherein at least one carrier 26 forms a section of the inlet duct 8. Since the carrier plate 25 is arranged at a distance from the second end 10 of the central well 1, the inner surface of the casing 13 forms the outlet duct 14 in combination with the outer surface of the central well 1 and the carriers 26 which outlet duct 14 extends to the outlet opening 19 that is delimited between the casing 13 and pipe section 16.

Figure 3:
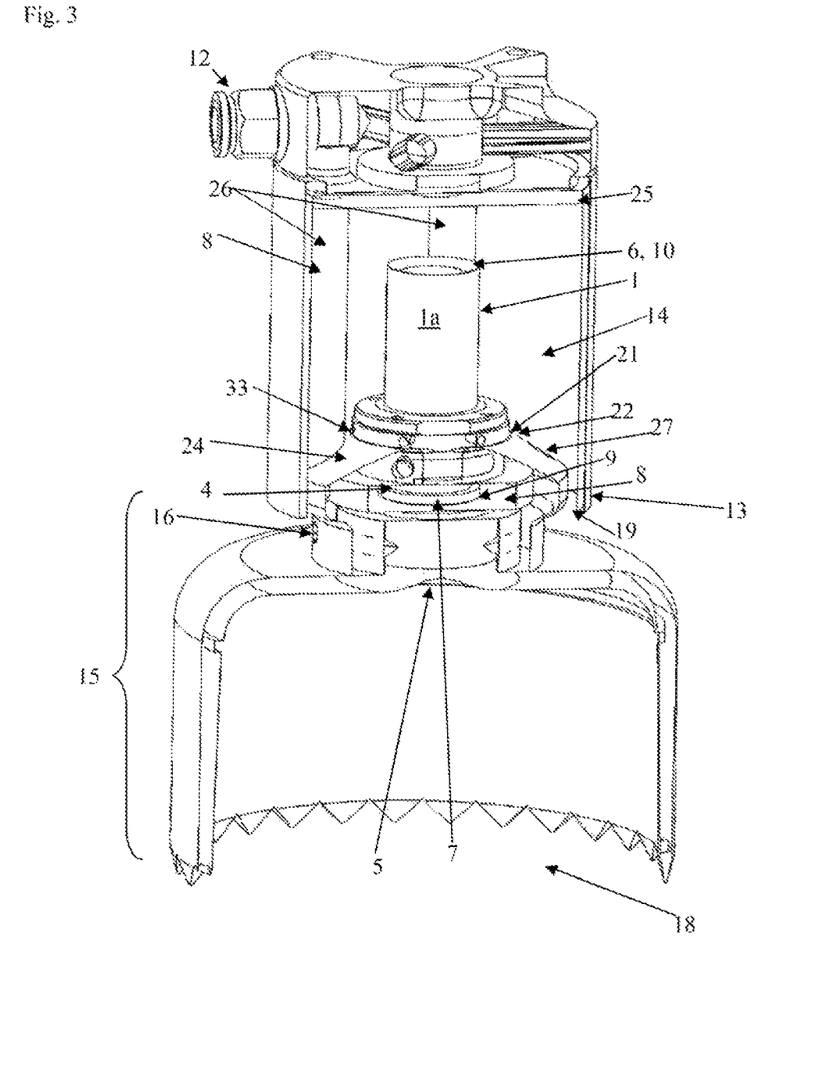

In FIG. 3, the section is drawn in front of the central well 1 such that the outer surface of the central well 1 is visible. As depicted, it is generally preferred that in embodiments in which the outlet duct 14 leads into an outlet opening 19 which is directed towards the plane of the suction opening, the pipe section 16 has a socket 24 having a surface 27 extending from the second abutment face 22 to the outlet opening 19, and especially runs with an incline against the longitudinal axis of the central well 1.

Figure 4:
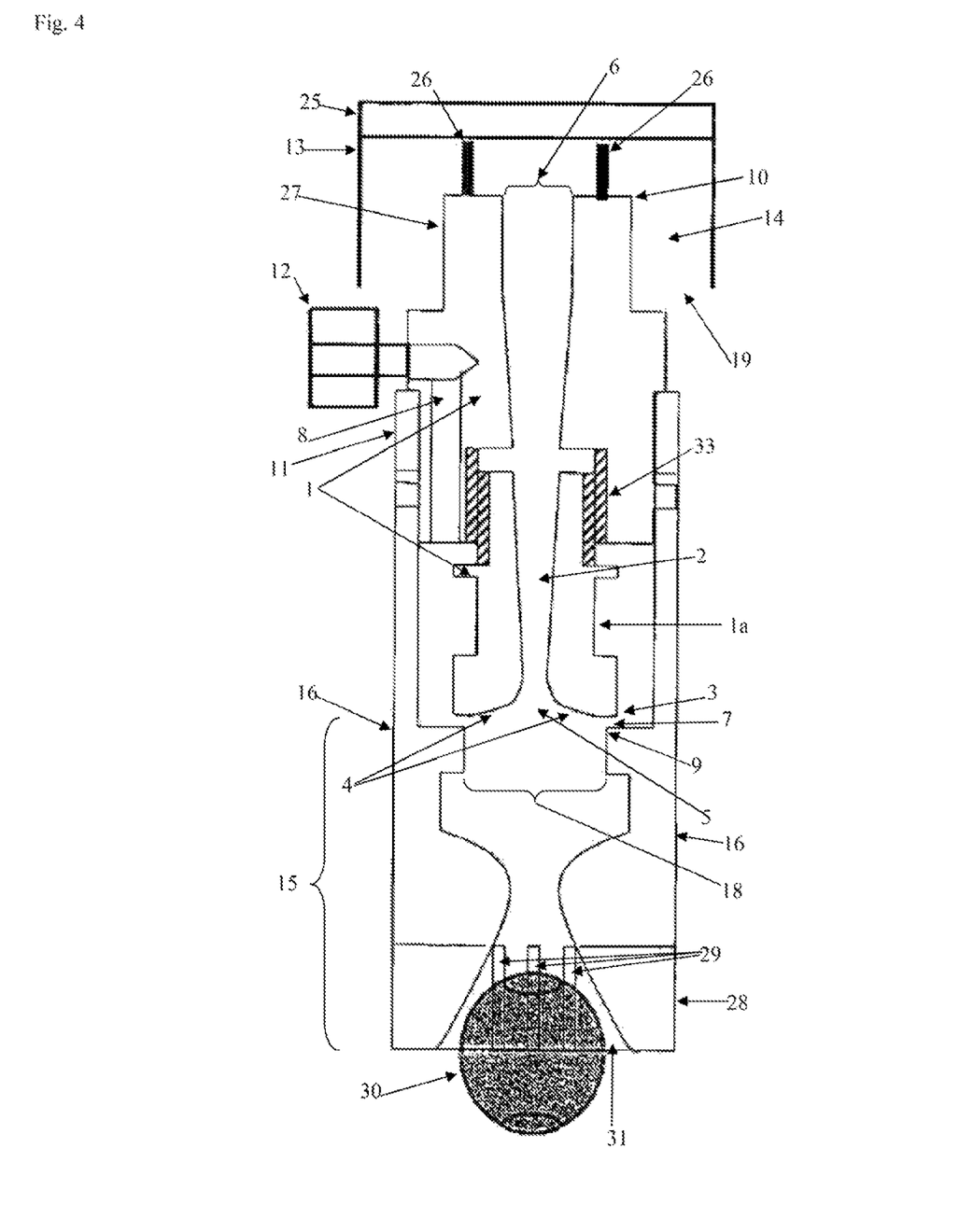

FIG. 4 in sectional view shows a suction gripper having a holding device 28 having openings 29 in the shell-shaped or funnel-shaped surface 31, through which the low pressure being present in the suction section 15 can act on a fruit 30. The openings 29, as generally preferred, are arranged radially to the longitudinal axis of the central well 1.

Figure 5:
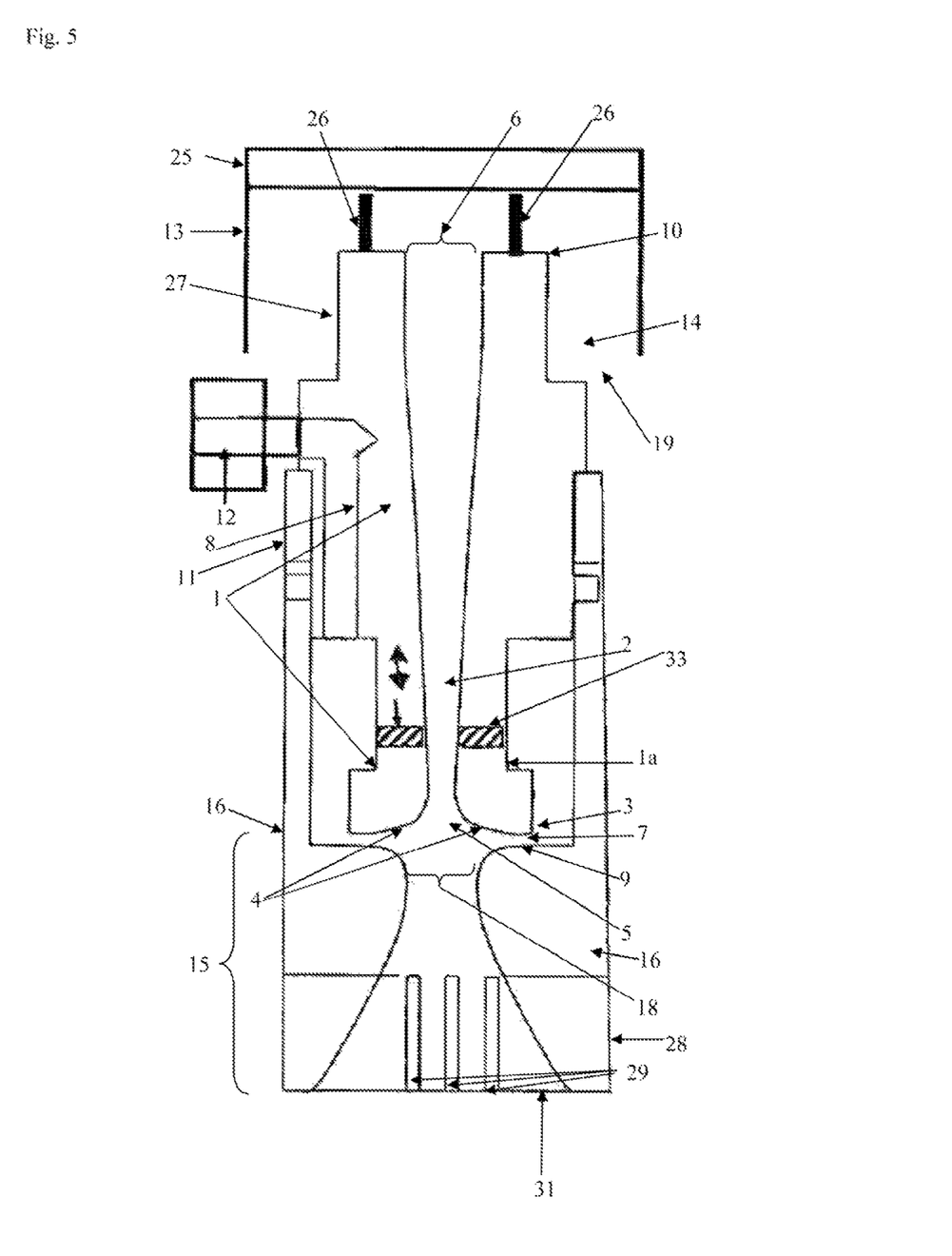

FIG. 5 shows a suction gripper having a holding device 28 in which the central well 1 has two sections moveable against one another along the common axis which by means of an actuator 33 are moveable, against one another in controlled manner.

LIST OF REFERENCE NUMERALS

1 central well
1*a* outer wall of the central well 1
2 central channel
3 first end of the central well 1
4 convex surface
5 first opening
6 second opening
7 annular outlet
8 inlet duct
9 shoulder
10 second end of the central well 1
11 pipeline
12 compressed-air connection
13 casing
14 outlet duct
15 suction section
16 pipe section
17 lip seal
18 suction opening
19 outlet opening
20 ring channel section
21 first abutment face
22 second abutment face
23 lug of the central well
24 socket
25 carrier plate
26 carrier
27 surface of the socket
28 holding device
29 opening
30 fruit
31 surface of the holding device 28
32 grid
33 actuator

The invention claimed is:

1. A suction gripper for use as lifting device for an object, wherein the suction gripper has a suction opening opened up by a pipe section forming a suction section, wherein at a distance to the suction opening a convex surface is arranged spaced from the suction section by an annular outlet, which convex surface opens up a first opening of a central channel formed within a central well, wherein the convex surface leads into an axial section having the smallest cross-section of the central channel to which a section of the central channel adjoins that broadens towards a second opening opposite the first opening, and the annular outlet is connected to a compressed-air connection by an inlet duct, wherein the central well is guided longitudinally displaceable in a recess of the pipe section, until a first abutment face of the outer surface of the central well opposite the central channel lies against a parallel second abutment face of the pipe section, wherein the annular outlet is formed by a section of the convex surface spaced radially from the longitudinal axis of the central channel and by a shoulder spaced axially thereto, which covers the convex surface at least in an annular region.

2. The suction gripper according to claim 1, wherein the central well is enclosed by a casing.

3. The suction gripper according to claim 1 for use as a portioning device for a food, in which the cross-section of the suction section formed by the pipe section is spanned by a grid, the openings of which are smaller than the cross-section of the food.

4. The suction gripper according to claim 1, wherein the second opening of the central well opposite the first opening is at least partially sealable by means of a valve, which is arranged at the second opening or at a pipeline which is connected to the second opening of the central well and forms the outlet duct.

5. The suction gripper according to claim 1, wherein the inlet duct is sectionally formed by the outer wall of the central well and by a coaxially arranged spaced pipeline.

6. The suction gripper according to claim 1, wherein the central well is formed by a first section and a second section movable along the longitudinal axis of the central channel.

7. The suction gripper according to claim 1, wherein the convex surface has a parabolic profile radially to the longitudinal axis of the central channel, the incline of which increases with decreasing radius of the central channel.

8. The suction gripper according to claim 1, having a valve which is disposed for periodically opening the pipeline for compressed-air connection to the annular outlet.

9. The suction gripper according to claim 1, wherein in front of the suction opening a holding device having a surface having a funnel shape is arranged, which surface has openings connecting the surface to the suction opening.

10. A suction gripper for use as lifting device for an object, wherein the suction gripper has a suction opening opened up by a pipe section forming a suction section, wherein at a distance to the suction opening a convex surface is arranged spaced from the suction section by an annular outlet, which convex surface opens up a first opening of a central channel formed within a central well, wherein the convex surface leads into an axial section having the smallest cross-section of the central channel to which a section of the central channel adjoins that broadens towards a second opening opposite the first opening, and the annular outlet is connected to a compressed-air connection by an inlet duct, wherein the central well is guided longitudinally displaceable in a recess of the pipe section, until a first abutment face of the outer surface of the central well opposite the central channel lies against a parallel second abutment face of the pipe section, wherein the central well is guided in a recess of a socket of the pipe section, and the second abutment face comprises the recess of the socket.

11. A suction gripper for use as lifting device for an object, wherein the suction gripper has a suction opening opened up by a pipe section forming a suction section, wherein at a distance to the suction opening a convex surface is arranged spaced from the suction section by an annular outlet, which convex surface opens up a first opening of a central channel formed within a central well, wherein the convex surface leads into an axial section having the smallest cross-section of the central channel to which a section of the central channel adjoins that broadens towards a second opening opposite the first opening, and the annular outlet is connected to a compressed-air connection by an inlet duct, wherein the central well is guided longitudinally displaceable in a recess of the pipe section, until a first abutment face of the outer surface of the central well opposite the central channel lies against a parallel second abutment face of the pipe section, wherein an actuator is arranged at the central well by which the central well is at least sectionally moveable in relation to the shoulder of the pipe section.

12. The suction gripper according to claim 11, wherein a pressure sensor is arranged in the suction section and the actuator is controllable in dependence from the measuring signal of the pressure sensor.

13. A suction gripper for use as lifting device for an object, wherein the suction gripper has a suction opening opened up by a pipe section forming a suction section, wherein at a distance to the suction opening a convex surface is arranged spaced from the suction section by an annular outlet, which convex surface opens up a first opening of a central channel formed within a central well, wherein the convex surface leads into an axial section having the smallest cross-section of the central channel to which a section of the central channel adjoins that broadens towards a second opening opposite the first opening, and the annular outlet is connected to a compressed-air connection by an inlet duct, wherein the central well is guided longitudinally displaceable in a recess of the pipe section, until a first abutment face of the outer surface of the central well opposite the central channel lies against a parallel second abutment face of the pipe section, wherein the central well is locked to the pipe section by one of a bayonet catch or by a thread.

14. A suction gripper for use as lifting device for an object, wherein the suction gripper has a suction opening opened up by a pipe section forming a suction section, wherein at a distance to the suction opening a convex surface is arranged spaced from the suction section by an annular outlet, which convex surface opens up a first opening of a central channel formed within a central well, wherein the convex surface leads into an axial section having the smallest cross-section of the central channel to which a section of the central channel adjoins that broadens towards a second opening opposite the first opening, and the annular outlet is connected to a compressed-air connection by an inlet duct, wherein the central well is guided longitudinally displaceable in a recess of the pipe section, until a first abutment face of the outer surface of the central well opposite the central channel lies against a parallel second abutment face of the pipe section, wherein the central well is enclosed by a casing and the second opening of the central well is connected to a pipeline which projects above the casing.

15. A suction gripper for use as lifting device for an object, wherein the suction gripper has a suction opening opened up by a pipe section forming a suction section, wherein at a distance to the suction opening a convex surface is arranged spaced from the suction section by an annular outlet, which convex surface opens up a first opening of a central channel formed within a central well, wherein the convex surface leads into an axial section having the smallest cross-section of the central channel to which a section of the central channel adjoins that broadens towards a second opening opposite the first opening, and the annular outlet is connected to a compressed-air connection by an inlet duct, wherein the central well is guided longitudinally displaceable in a recess of the pipe section, until a first abutment face of the outer surface of the central well opposite the central channel lies against a parallel second abutment face of the pipe section, wherein the central well is enclosed by a casing and the casing is arranged at a distance to the second opening and encloses an outlet duct leading into an outlet opening which is delimited by the pipe section and the casing and is directed towards the plane in which the suction opening lies.

16. The suction gripper according to claim 15, wherein the socket has a continuous surface which extends from the second abutment face to the outlet opening and is inclined against the longitudinal axis of the central well.

* * * * *

UNITED STATES PATENT AND TRADEMARK OFFICE
CERTIFICATE OF CORRECTION

| | | |
|---|---|---|
| PATENT NO. | : 8,616,602 B2 | Page 1 of 1 |
| APPLICATION NO. | : 13/197967 | |
| DATED | : December 31, 2013 | |
| INVENTOR(S) | : Hukelmann et al. | |

It is certified that error appears in the above-identified patent and that said Letters Patent is hereby corrected as shown below:

In the Specification:

Col. 2, line 1    Before "section", please delete "pip" and insert --pipe-- in its place.

Signed and Sealed this
Twelfth Day of August, 2014

Michelle K. Lee
*Deputy Director of the United States Patent and Trademark Office*